United States Patent
Khlat

(10) Patent No.: US 9,859,943 B2
(45) Date of Patent: Jan. 2, 2018

(54) TUNABLE RF DIPLEXER

(71) Applicant: RF Micro Devices, Inc., Greensboro, NC (US)

(72) Inventor: Nadim Khlat, Cugnaux (FR)

(73) Assignee: Qorvo US, Inc., Greensboro, NC (US)

( * ) Notice: Subject to any disclaimer, the term of this patent is extended or adjusted under 35 U.S.C. 154(b) by 0 days.

(21) Appl. No.: 14/498,991

(22) Filed: Sep. 26, 2014

(65) Prior Publication Data
US 2015/0087246 A1    Mar. 26, 2015

Related U.S. Application Data

(60) Provisional application No. 61/882,671, filed on Sep. 26, 2013.

(51) Int. Cl.
| | |
|---|---|
| H04B 1/40 | (2015.01) |
| H04L 5/14 | (2006.01) |
| H04B 1/00 | (2006.01) |
| H04B 15/00 | (2006.01) |
| H04L 5/08 | (2006.01) |
| H04B 7/0413 | (2017.01) |

(52) U.S. Cl.
CPC ............. *H04B 1/40* (2013.01); *H04B 1/0057* (2013.01); *H04B 15/00* (2013.01); *H04L 5/08* (2013.01); *H04L 5/14* (2013.01); *H04B 7/0413* (2013.01)

(58) Field of Classification Search
CPC .................................................. H04B 1/0057
See application file for complete search history.

(56) References Cited

U.S. PATENT DOCUMENTS

| | | | | |
|---|---|---|---|---|
| 3,656,162 | A * | 4/1972 | Mee | H03H 7/0115 370/339 |
| 3,946,328 | A * | 3/1976 | Boctor | H03H 11/126 327/553 |
| 4,902,992 | A | 2/1990 | Rubin et al. | |
| 5,644,274 | A | 7/1997 | Kaida | |
| 5,774,193 | A | 6/1998 | Vaughan | |
| 6,333,591 | B1 | 12/2001 | Yoshio et al. | |
| 6,586,786 | B2 * | 7/2003 | Kitazawa | H01P 1/15 257/275 |
| 6,710,813 | B1 | 3/2004 | Grandchamp et al. | |

(Continued)

OTHER PUBLICATIONS

Vizmuller, Peter, "Chapter 2: Circuit Examples," RF Design Guide: Systems, Circuits, and Equations, Norwood: Artech House, 1995, pp. 95-98.
Young, Leo, et al., "A High Power Diplexing Filter," IRE Transactions on Microwave Theory and Techniques, vol. 7, No. 3, Jul. 1959, pp. 384-387.
Notice of Allowance for U.S. Appl. No. 14/302,500, dated Oct. 23, 2015, 8 pages.

(Continued)

*Primary Examiner* — Hsin-Chun Liao
(74) *Attorney, Agent, or Firm* — Withrow & Terranova, P.L.L.C.

(57) ABSTRACT

A first RF diplexer, which includes a first RF highpass with tunable notch filter and a first RF lowpass with tunable notch filter, is disclosed. The first RF diplexer has a first main port, a second main port, and a first common port. The first RF highpass with tunable notch filter is coupled between the first main port and the first common port. The first RF lowpass with tunable notch filter is coupled between the second main port and the first common port. The first RF highpass with tunable notch filter has a first highpass notch frequency, which is tunable. The first RF lowpass with tunable notch filter has a first lowpass notch frequency, which is tunable.

20 Claims, 9 Drawing Sheets

(56) References Cited

U.S. PATENT DOCUMENTS

| | | | |
|---|---|---|---|
| 6,980,067 B2 | 12/2005 | Forrester et al. | |
| 7,035,602 B2 | 4/2006 | Satoh et al. | |
| 7,078,987 B1 | 7/2006 | Petrovic | |
| 7,330,500 B2 | 2/2008 | Kouki | |
| 7,376,440 B2 | 5/2008 | Forrester et al. | |
| 7,546,091 B2 | 6/2009 | Murakami et al. | |
| 8,149,742 B1 | 4/2012 | Sorsby | |
| 8,385,871 B2 | 2/2013 | Wyville | |
| 8,552,816 B2 | 10/2013 | Khlat | |
| 8,634,029 B2 | 1/2014 | Pugel | |
| 8,849,217 B2 | 9/2014 | Rousu et al. | |
| 8,892,057 B2 | 11/2014 | Khlat | |
| 8,903,409 B2 | 12/2014 | Winiecki et al. | |
| 8,933,764 B2 | 1/2015 | Khlat et al. | |
| 9,118,376 B2 | 8/2015 | Khlat et al. | |
| 9,124,355 B2 | 9/2015 | Black et al. | |
| 2002/0053954 A1 | 5/2002 | Shamsaifar et al. | |
| 2002/0130734 A1* | 9/2002 | Liang et al. | 333/134 |
| 2002/0137471 A1 | 9/2002 | Satoh et al. | |
| 2004/0189526 A1 | 9/2004 | Frank | |
| 2005/0020297 A1 | 1/2005 | Axness et al. | |
| 2005/0195047 A1 | 9/2005 | Park et al. | |
| 2005/0239421 A1 | 10/2005 | Kim et al. | |
| 2006/0035615 A1 | 2/2006 | Hoover | |
| 2006/0087385 A1 | 4/2006 | Fitzpatrick et al. | |
| 2006/0194550 A1 | 8/2006 | Block et al. | |
| 2007/0022460 A1 | 1/2007 | Kim et al. | |
| 2008/0240000 A1 | 10/2008 | Kidd | |
| 2009/0174622 A1 | 7/2009 | Kanou | |
| 2009/0219908 A1 | 9/2009 | Rofougaran et al. | |
| 2009/0289744 A1 | 11/2009 | Miyashiro | |
| 2010/0102899 A1 | 4/2010 | Engel | |
| 2010/0189031 A1 | 7/2010 | Kanou | |
| 2010/0295630 A1 | 11/2010 | Itoh et al. | |
| 2011/0032854 A1 | 2/2011 | Carney et al. | |
| 2011/0069644 A1 | 3/2011 | Kim et al. | |
| 2011/0110452 A1 | 5/2011 | Fukamachi et al. | |
| 2011/0140803 A1 | 6/2011 | Kim et al. | |
| 2012/0161904 A1 | 6/2012 | Do et al. | |
| 2013/0077540 A1* | 3/2013 | Black et al. | 370/277 |
| 2013/0083703 A1 | 4/2013 | Granger-Jones et al. | |
| 2013/0090080 A1 | 4/2013 | Schmidt | |
| 2013/0135052 A1 | 5/2013 | Arkiszewski | |
| 2013/0176913 A1 | 7/2013 | Niskanen et al. | |
| 2013/0187825 A1 | 7/2013 | Andujar Linares et al. | |
| 2013/0201880 A1 | 8/2013 | Bauder et al. | |
| 2013/0201882 A1 | 8/2013 | Bauder et al. | |
| 2013/0235806 A1 | 9/2013 | Nilsson et al. | |
| 2013/0244591 A1 | 9/2013 | Weissman et al. | |
| 2013/0244722 A1 | 9/2013 | Rousu et al. | |
| 2014/0003300 A1 | 1/2014 | Weissman et al. | |
| 2014/0185498 A1 | 7/2014 | Schwent et al. | |
| 2014/0192845 A1 | 7/2014 | Szini et al. | |
| 2014/0269853 A1 | 9/2014 | Gudem et al. | |
| 2014/0321353 A1 | 10/2014 | Zhan | |
| 2014/0323076 A1 | 10/2014 | Kintis et al. | |
| 2015/0017993 A1 | 1/2015 | Ishii | |
| 2016/0126987 A1 | 5/2016 | Wloczysiak | |
| 2016/0127029 A1 | 5/2016 | Wloczysiak | |
| 2017/0310381 A1 | 10/2017 | Lim et al. | |

OTHER PUBLICATIONS

Notice of Allowance for U.S. Appl. No. 14/282,393, dated Aug. 19, 2015, 8 pages.

Non-Final Office Action for U.S. Appl. No. 14/498,746, dated Feb. 24, 2016, 11 pages.

Non-Final Office Action for U.S. Appl. No. 14/497,919, dated Mar. 10, 2016, 21 pages.

Notice of Allowance for U.S. Appl. No. 14/525,092, dated Apr. 11, 2016, 7 pages.

Non-Final Office Action for U.S. Appl. No. 14/267,095, dated Jun. 16, 2016, 8 pages.

Final Office Action for U.S. Appl. No. 141498,746, dated Aug. 5, 2016, 12 pages.

Non-Final Office Action for U.S. Appl. No. 14/523,065, dated Aug. 2, 2016, 38 pages.

Notice of Allowance for U.S. Appl. No. 14/267,095, dated Mar. 29, 2017, 7 pages.

Notice of Allowance for U.S. Appl. No. 14/659,314, dated Apr. 3, 2017, 8 pages.

Non-Final Office Action for U.S. Appl. No. 14/673,192, dated Apr. 14, 2017, 5 pages.

Non-Final Office Action for U.S. Appl. No. 14/497,919, dated May 12, 2017, 26 pages.

Final Office Action for U.S. Appl. No. 14/523,065, dated Mar. 9, 2017, 34 pages.

Advisory Action for U.S. Appl. No. 14/497,919, mailed Feb. 21, 2017, 3 pages.

Final Office Action for U.S. Appl. No. 14/498,746, dated Aug. 5, 2016, 12 pages.

Non-Final Office Action for U.S. Appl. No. 14/659,314, dated Sep. 19, 2016, 15 pages.

Final Office Action for U.S. Appl. No. 14/497,919, dated Sep. 22, 2016, 26 pages.

Notice of Allowance for U.S. Appl. No. 14/498,746, dated Nov. 15, 2016, 8 pages.

Non-Final Office Action for U.S. Appl. No. 14/547,502, dated Sep. 29, 2016, 46 pages.

Frenzel, Lou, "Understanding Solutions for the Crowded Electromagnetic Frequency Spectrum," Electronic Design, Mar. 21, 2012, Penton, 16 pages, http://electronicdesign.com/communications/understanding-solutions-crowded-electromagnetic-frequency-spectrum.

Non-Final Office Action for U.S. Appl. No. 14/267,095, dated Dec. 27, 2016, 10 pages.

Non-Final Office Action for U.S. Appl. No. 14/673,192, dated Dec. 15, 2016, 9 pages.

Non-Final Office Action for U.S. Appl. No. 14/523,065, dated Jul. 24, 2017, 20 pages.

Notice of Allowance for U.S. Appl. No. 14/547,502, dated Sep. 22, 2017, 10 pages.

Notice of Allowance and Examiner-Initiated Interview Summary for U.S. Appl. No. 14/673,192, dated Sep. 18, 2017, 7 pages.

Corrected Notice of Allowability for U.S. Appl. No. 14/547,502, dated Oct. 31, 2017, 6 pages.

Notice of Allowance and Examiner-Initiated Interview Summary for U.S. Appl. No. 14/497,919, dated Nov. 6, 2017, 19 pages.

* cited by examiner

TUNABLE RF DIPLEXER

RELATED APPLICATIONS

The present application claims the benefit of U.S. provisional patent application No. 61/882,671, filed Sep. 26, 2013.

The present application is related to concurrently filed U.S. patent application Ser. No. 14/497,919, entitled "CARRIER AGGREGATION USING MULTIPLE ANTENNAS," and U.S. patent application Ser. No. 14/498,746, now U.S. Pat. No. 9,608,688, entitled "HIGH LINEARITY RF DIPLEXER."

The present application further relates to U.S. patent application Ser. No. 14/267,095, entitled "CARRIER AGGREGATION ARRANGEMENTS FOR MOBILE DEVICES," filed on May 1, 2014, now U.S. Pat. No. 9,722,639, which claims priority to U.S. provisional patent applications No. 61/817,912, filed May 1, 2013, No. 61/817,923, filed May 1, 2013, and No. 61/826,659, filed May 23, 2013; U.S. patent application Ser. No. 14/282,393, entitled "TUNABLE FILTER FRONT END ARCHITECTURE FOR NON-CONTIGUOUS CARRIER AGGREGATION," filed on May 20, 2014, now U.S. Pat. No. 9,225,382, which claims priority to U.S. provisional patent application No. 61/825,236, filed May 20, 2013; and U.S. patent application Ser. No. 14/302,500, entitled "CARRIER AGGREGATION ARRANGEMENT USING TRIPLE ANTENNA ARRANGEMENT," filed on Jun. 12, 2014, now U.S. Pat. No. 9,270,302, which claims priority to U.S. provisional patent application No. 61/837,460, filed Jun. 20, 2013.

All of the applications listed above are hereby incorporated herein by reference in their entireties.

FIELD OF THE DISCLOSURE

Embodiments of the present disclosure relate to radio frequency (RF) communications systems, which may include RF front-end circuitry, RF transceiver circuitry, RF transmit circuitry, RF receive circuitry, RF diplexers, RF duplexers, RF filters, RF antennas, RF switches, RF combiners, RF splitters, the like, or any combination thereof.

BACKGROUND

As wireless communications technologies evolve, wireless communications systems become increasingly sophisticated. As such, wireless communications protocols continue to expand and change to take advantage of the technological evolution. As a result, to maximize flexibility, many wireless communications devices must be capable of supporting any number of wireless communications protocols, each of which may have certain performance requirements, such as specific out-of-band emissions requirements, linearity requirements, or the like. Further, portable wireless communications devices are typically battery powered and need to be relatively small, and have low cost. As such, to minimize size, cost, and power consumption, RF circuitry in such a device needs to be as simple, small, flexible, and efficient as is practical. Thus, there is a need for RF circuitry in a communications device that is low cost, small, simple, flexible, and efficient.

SUMMARY

A first RF diplexer, which includes a first RF highpass with tunable notch filter and a first RF lowpass with tunable notch filter, is disclosed according to one embodiment of the present disclosure. The first RF diplexer has a first main port, a second main port, and a first common port. The first RF highpass with tunable notch filter is coupled between the first main port and the first common port. The first RF lowpass with tunable notch filter is coupled between the second main port and the first common port. The first RF highpass with tunable notch filter has a first highpass notch frequency, which is tunable. The first RF lowpass with tunable notch filter has a first lowpass notch frequency, which is tunable.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

A first RF diplexer, which includes a first RF highpass with tunable notch filter and a first RF lowpass with tunable notch filter, is disclosed according to one embodiment of the present disclosure. The first RF diplexer has a first main port, a second main port, and a first common port. The first RF highpass with tunable notch filter is coupled between the first main port and the first common port. The first RF lowpass with tunable notch filter is coupled between the second main port and the first common port. The first RF highpass with tunable notch filter has a first highpass notch frequency, which is tunable. The first RF lowpass with tunable notch filter has a first lowpass notch frequency, which is tunable.

Figure 1:
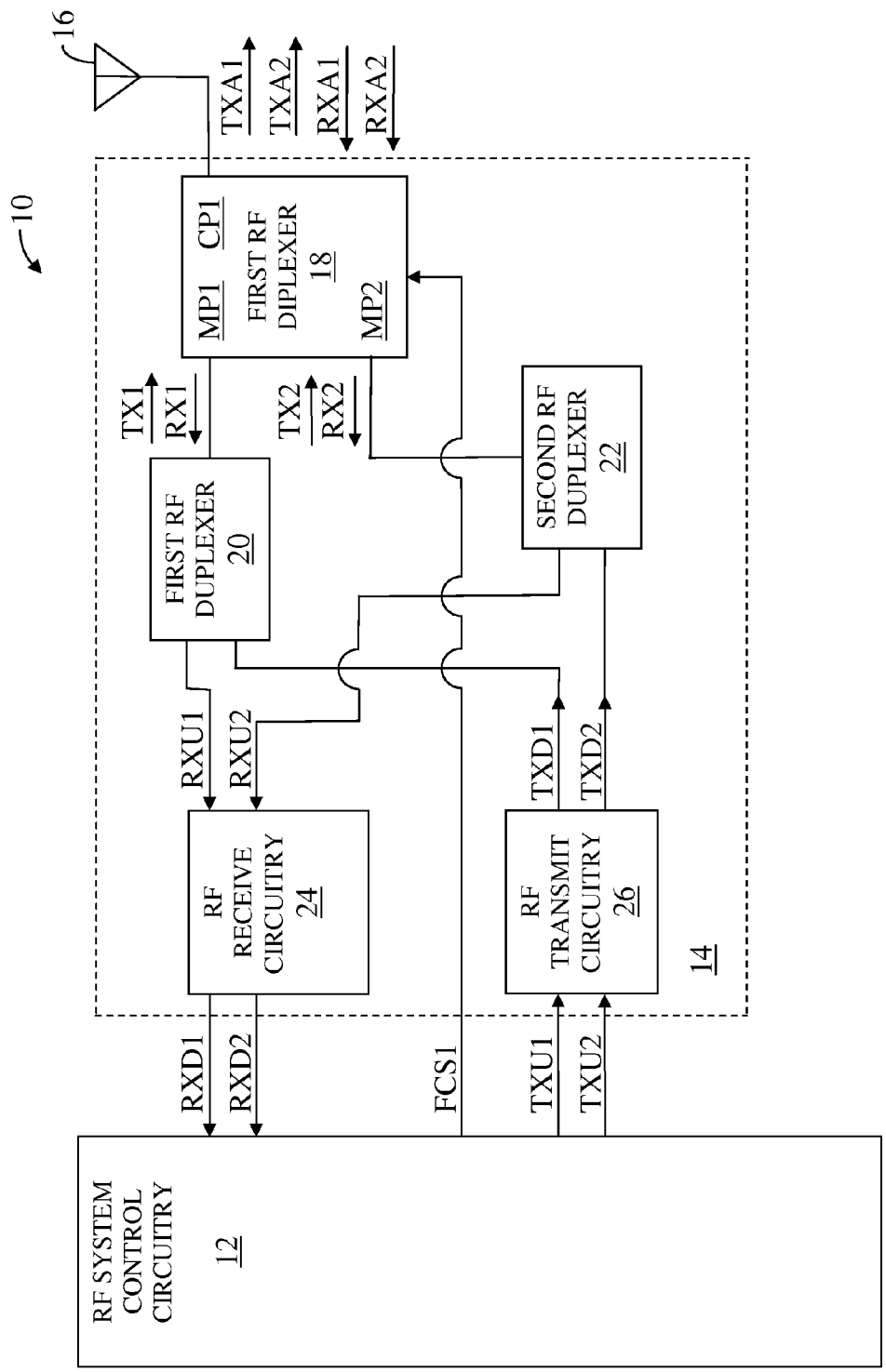
FIG. 1 shows RF communications circuitry according to one embodiment of the RF communications circuitry.

FIG. 1 shows RF communications circuitry 10 according to one embodiment of the RF communications circuitry 10. The RF communications circuitry 10 includes RF system control circuitry 12, RF front-end circuitry 14, and a primary RF antenna 16. The RF front-end circuitry 14 includes a first RF diplexer 18, a first RF duplexer 20, a second RF duplexer 22, RF receive circuitry 24, and RF transmit circuitry 26. The first RF diplexer 18 has a first common port CP1, a first main port MP1, and a second main port MP2. The first common port CP1 is coupled to the primary RF antenna 16. The first main port MP1 is coupled to the first RF duplexer 20. The second main port MP2 is coupled to the second RF duplexer 22.

In one embodiment of the RF communications circuitry 10, the RF communications circuitry 10 transmits, receives, or both, RF signals to, from, or both, a highband RF communications band, a lowband RF communications band, or both. As such, the RF communications circuitry 10 may communicate simultaneously with both a highband RF communications band and a lowband RF communications band, which are defined as follows. A lowest frequency of the highband RF communications band is greater than all frequencies in the lowband RF communications band. In this regard, highband RF signals fall within the highband RF communications band and lowband RF signals fall within the lowband RF communications band, such that a frequency of a highband RF signal is, by definition, higher than a frequency of a lowband RF signal for a given embodiment of the highband RF communications band and the lowband RF communications band.

In one embodiment of the RF system control circuitry 12, the RF system control circuitry 12 provides a first upstream RF transmit signal TXU1 to the RF transmit circuitry 26, which processes the first upstream RF transmit signal TXU1 to provide a first downstream RF transmit signal TXD1. In one embodiment of the first downstream RF transmit signal TXD1, the first downstream RF transmit signal TXD1 is a highband RF signal.

In an alternate embodiment of the RF system control circuitry 12, the RF system control circuitry 12 provides a second upstream RF transmit signal TXU2 to the RF transmit circuitry 26, which processes the second upstream RF transmit signal TXU2 to provide a second downstream RF transmit signal TXD2. In one embodiment of the second downstream RF transmit signal TXD2, the second downstream RF transmit signal TXD2 is a lowband RF signal.

In an additional embodiment of the RF system control circuitry 12, the RF system control circuitry 12 simultaneously provides the first upstream RF transmit signal TXU1 and the second upstream RF transmit signal TXU2 to the RF transmit circuitry 26, which processes the first upstream RF transmit signal TXU1 and the second upstream RF transmit signal TXU2, respectively, to provide the first downstream RF transmit signal TXD1 and the second downstream RF transmit signal TXD2, respectively. In one embodiment of the first downstream RF transmit signal TXD1 and the second downstream RF transmit signal TXD2, the first downstream RF transmit signal TXD1 is a highband RF signal and the second downstream RF transmit signal TXD2 is a lowband RF signal.

In one embodiment of the RF communications circuitry 10, the RF communications circuitry 10 provides transmit uplink carrier aggregation (TXULCA) by simultaneously providing the first upstream RF transmit signal TXU1 and the second upstream RF transmit signal TXU2 to the RF transmit circuitry 26. The RF transmit circuitry 26 may include up-conversion circuitry, amplification circuitry, power supply circuitry, filtering circuitry, switching circuitry, combining circuitry, splitting circuitry, dividing circuitry, clocking circuitry, the like, or any combination thereof to process the first upstream RF transmit signal TXU1 and the second upstream RF transmit signal TXU2.

In one embodiment of the RF receive circuitry 24, the RF receive circuitry 24 receives and processes a first upstream RF receive signal RXU1 to provide a first downstream RF receive signal RXD1 to the RF system control circuitry 12. In one embodiment of the first upstream RF receive signal RXU1, the first upstream RF receive signal RXU1 is a highband RF signal.

In an alternate embodiment of the RF receive circuitry 24, the RF receive circuitry 24 receives and processes a second upstream RF receive signal RXU2 to provide a second downstream RF receive signal RXD2 to the RF system control circuitry 12. In one embodiment of the second upstream RF receive signal RXU2, the second upstream RF receive signal RXU2 is a lowband RF signal.

In an additional embodiment of the RF receive circuitry 24, the RF receive circuitry 24 simultaneously receives and processes the first upstream RF receive signal RXU1 and the second upstream RF receive signal RXU2, respectively, to provide the first downstream RF receive signal RXD1 and the second downstream RF receive signal RXD2, respectively. In one embodiment of the first upstream RF receive signal RXU1 and second upstream RF receive signal RXU2, the first upstream RF receive signal RXU1 is a highband RF signal and the second upstream RF receive signal RXU2 is a lowband RF signal.

In one embodiment of the RF receive circuitry 24, the RF receive circuitry 24 supports receive downlink carrier aggregation (RXDLCA) by simultaneously receiving and processing the first upstream RF receive signal RXU1 and the second upstream RF receive signal RXU2. The RF receive circuitry 24 may include down-conversion circuitry, amplification circuitry, low noise amplification circuitry, power supply circuitry, filtering circuitry, switching circuitry, combining circuitry, splitting circuitry, dividing circuitry, clocking circuitry, the like, or any combination thereof.

In one embodiment of the RF front-end circuitry 14, any or all of the first upstream RF transmit signal TXU1, the first downstream RF transmit signal TXD1, the second upstream RF transmit signal TXU2, the second downstream RF transmit signal TXD2, the first upstream RF receive signal RXU1, the first downstream RF receive signal RXD1, the second upstream RF receive signal RXU2, and the second downstream RF receive signal RXD2 are omitted.

An RF duplexer is a well-known RF device in the art having a common port (not shown), a transmit signal port (not shown), and a receive signal port (not shown). Combined RF receive and transmit signals at the common port are separated into an RF receive signal at the receive signal port and an RF transmit signal at the transmit signal port. The RF duplexer is used to at least partially isolate the receive signal port from the RF transmit signal to help receive performance by avoiding receiver de-sensitization of RF receive circuitry by the RF transmit signal. The RF transmit signal and the RF receive signal are separated by a duplex frequency. Additionally, the RF transmit signal and the RF receive signal fall within one respective RF communications band.

The first RF duplexer 20 receives and provides a first RF receive signal RX1 and a first RF transmit signal TX1, respectively. In one embodiment of the first RF duplexer 20, the first RF duplexer 20 receives and provides the first RF receive signal RX1 and the first RF transmit signal TX1 simultaneously. In one embodiment of the first RF duplexer 20, the first RF receive signal RX1 and the first RF transmit signal TX1 are not received and provided simultaneously. In one embodiment of the first RF duplexer 20, the first RF receive signal RX1 is omitted. In one embodiment of the first RF duplexer 20, the first RF transmit signal TX1 is omitted. In one embodiment of the first RF duplexer 20, both the first RF receive signal RX1 and the first RF transmit signal TX1 are omitted. In one embodiment of the RF communications circuitry 10, the first RF duplexer 20 is omitted. In one embodiment of the first RF transmit signal TX1, the first RF transmit signal TX1 is a highband RF transmit signal. In one embodiment of the first RF receive signal RX1, the first RF receive signal RX1 is a highband RF receive signal.

In one embodiment of the first RF duplexer 20, the first RF duplexer 20 receives and forwards the first RF receive signal RX1 to provide the first upstream RF receive signal RXU1. In one embodiment of the first RF duplexer 20, the first RF duplexer 20 receives and forwards the first downstream RF transmit signal TXD1 to provide the first RF transmit signal TX1. In one embodiment of the first RF duplexer 20, the first RF duplexer 20 at least partially isolates the first downstream RF transmit signal TXD1 and the first RF transmit signal TX1 from the RF receive circuitry 24.

The second RF duplexer 22 receives and provides a second RF receive signal RX2 and a second RF transmit signal TX2, respectively. In one embodiment of the second RF duplexer 22, the second RF duplexer 22 receives and provides the second RF receive signal RX2 and the second RF transmit signal TX2 simultaneously. In one embodiment of the second RF duplexer 22, the second RF receive signal RX2 and the second RF transmit signal TX2 are not received and provided simultaneously. In one embodiment of the second RF duplexer 22, the second RF receive signal RX2 is omitted. In one embodiment of the second RF duplexer 22, the second RF transmit signal TX2 is omitted. In one embodiment of the second RF duplexer 22, both the second RF receive signal RX2 and the second RF transmit signal TX2 are omitted. In one embodiment of the RF communications circuitry 10, the second RF duplexer 22 is omitted. In one embodiment of the second RF transmit signal TX2, the second RF transmit signal TX2 is a lowband RF transmit signal. In one embodiment of the second RF receive signal RX2, the second RF receive signal RX2 is a lowband RF receive signal.

In one embodiment of the second RF duplexer 22, the second RF duplexer 22 receives and forwards the second RF receive signal RX2 to provide the second upstream RF receive signal RXU2. In one embodiment of the second RF duplexer 22, the second RF duplexer 22 receives and forwards the second downstream RF transmit signal TXD2 to provide the second RF transmit signal TX2. In one embodiment of the second RF duplexer 22, the second RF duplexer 22 at least partially isolates the second downstream RF transmit signal TXD2 and the second RF transmit signal TX2 from the RF receive circuitry 24.

As previously mentioned, the first RF diplexer 18 has the first common port CP1, the first main port MP1, and the second main port MP2. The first common port CP1 is coupled to the primary RF antenna 16. The first main port MP1 is coupled to the first RF duplexer 20. The second main port MP2 is coupled to the second RF duplexer 22. In general, in one embodiment of the first RF diplexer 18, the first RF diplexer 18 separates combined RF signals at the first common port CP1 into separate RF signals at each of the first main port MP1 and the second main port MP2. In one embodiment of the first RF diplexer 18, RF signals at the first main port MP1 are associated with one RF communications band, and RF signals at the second main port MP2 are associated with another RF communications band. Therefore, RF signals at the first common port CP1 may be associated with both RF communications bands.

By segregating the RF signals in this manner, processing of the RF signals may be simplified, may enhance RF performance, or both. As such, in one embodiment of the first RF diplexer 18, signals at the first main port MP1 are associated with a highband RF communications band and signals at the second main port MP2 are associated with a lowband RF communications band. Therefore, signals at the first common port CP1 may be associated with the highband RF communications band, the lowband RF communications band, or both.

In one embodiment of the first RF diplexer 18, the first main port MP1 is substantially isolated from the second main port MP2. In an exemplary embodiment of the first RF diplexer 18, highband RF signals at the first main port MP1 are isolated from the second main port MP2 by at least 37 decibels (dB). Conversely, in an exemplary embodiment of the first RF diplexer 18, lowband RF signals at the second main port MP2 are isolated from the first main port MP1 by at least 37 dB.

The first RF diplexer 18 receives and forwards the first RF transmit signal TX1 via the first main port MP1 to the first common port CP1 to provide a first RF antenna transmit signal TXA1. In one embodiment of the first RF transmit signal TX1, the first RF transmit signal TX1 is a highband RF transmit signal. In one embodiment of the first RF antenna transmit signal TXA1, the first RF antenna transmit signal TXA1 is a highband RF antenna transmit signal.

The first RF diplexer 18 receives and forwards the second RF transmit signal TX2 via the second main port MP2 to the first common port CP1 to provide a second RF antenna transmit signal TXA2. In one embodiment of the second RF transmit signal TX2, the second RF transmit signal TX2 is a lowband RF transmit signal. In one embodiment of the second RF antenna transmit signal TXA2, the second RF antenna transmit signal TXA2 is a lowband RF antenna transmit signal.

In one embodiment of the first RF diplexer 18, the first RF diplexer 18 establishes TXULCA by providing the lowband RF transmit signal and the highband RF transmit signal simultaneously. As such, the lowband RF antenna transmit signal and the highband RF antenna transmit signal are TXULCA signals. In one embodiment of the first RF diplexer 18, the highband RF antenna transmit signal is substantially isolated from the second main port MP2 and the lowband RF antenna transmit signal is substantially isolated from the first main port MP1. In an exemplary embodiment of the first RF diplexer 18, the highband RF antenna transmit signal is isolated from the second main port MP2 by at least 37 dB, and the lowband RF antenna transmit signal is isolated from the first main port MP1 by at least 37 dB.

The first RF diplexer 18 receives and forwards a first RF antenna receive signal RXA1 via the primary RF antenna 16 to the first main port MP1 to provide the first RF receive signal RX1. In one embodiment of the first RF antenna receive signal RXA1, the first RF antenna receive signal RXA1 is a highband RF antenna receive signal. In one embodiment of the first RF receive signal RX1, the first RF receive signal RX1 is a highband RF receive signal.

The first RF diplexer 18 receives and forwards a second RF antenna receive signal RXA2 via the primary RF antenna 16 to the second main port MP2 to provide the second RF receive signal RX2. In one embodiment of the second RF antenna receive signal RXA2, the second RF antenna receive signal RXA2 is a lowband RF antenna receive signal. In one embodiment of the second RF receive signal RX2, the second RF receive signal RX2 is a lowband RF receive signal.

In one embodiment of the first RF diplexer 18, the first RF diplexer 18 establishes RXDLCA by receiving the highband RF antenna receive signal and the lowband RF antenna receive signal simultaneously. As such, the highband RF antenna receive signal and the lowband RF antenna receive signal are RXDLCA signals.

In one embodiment of the RF front-end circuitry 14, any or all of the first RF transmit signal TX1, the second RF transmit signal TX2, the first RF antenna transmit signal TXA1, the second RF antenna transmit signal TXA2, the first RF receive signal RX1, the second RF receive signal RX2, the first RF antenna receive signal RXA1, and the second RF antenna receive signal RXA2 are omitted.

In one embodiment of the RF system control circuitry 12 and the first RF diplexer 18, the RF system control circuitry 12 provides a first function configuration signal FCS1 to the first RF diplexer 18. As such, the RF system control circuitry 12 may configure, tune, adjust, enable, disable, vary, or any combination thereof, circuits within the first RF diplexer 18 as necessary using the first function configuration signal FCS1.

Figure 2:
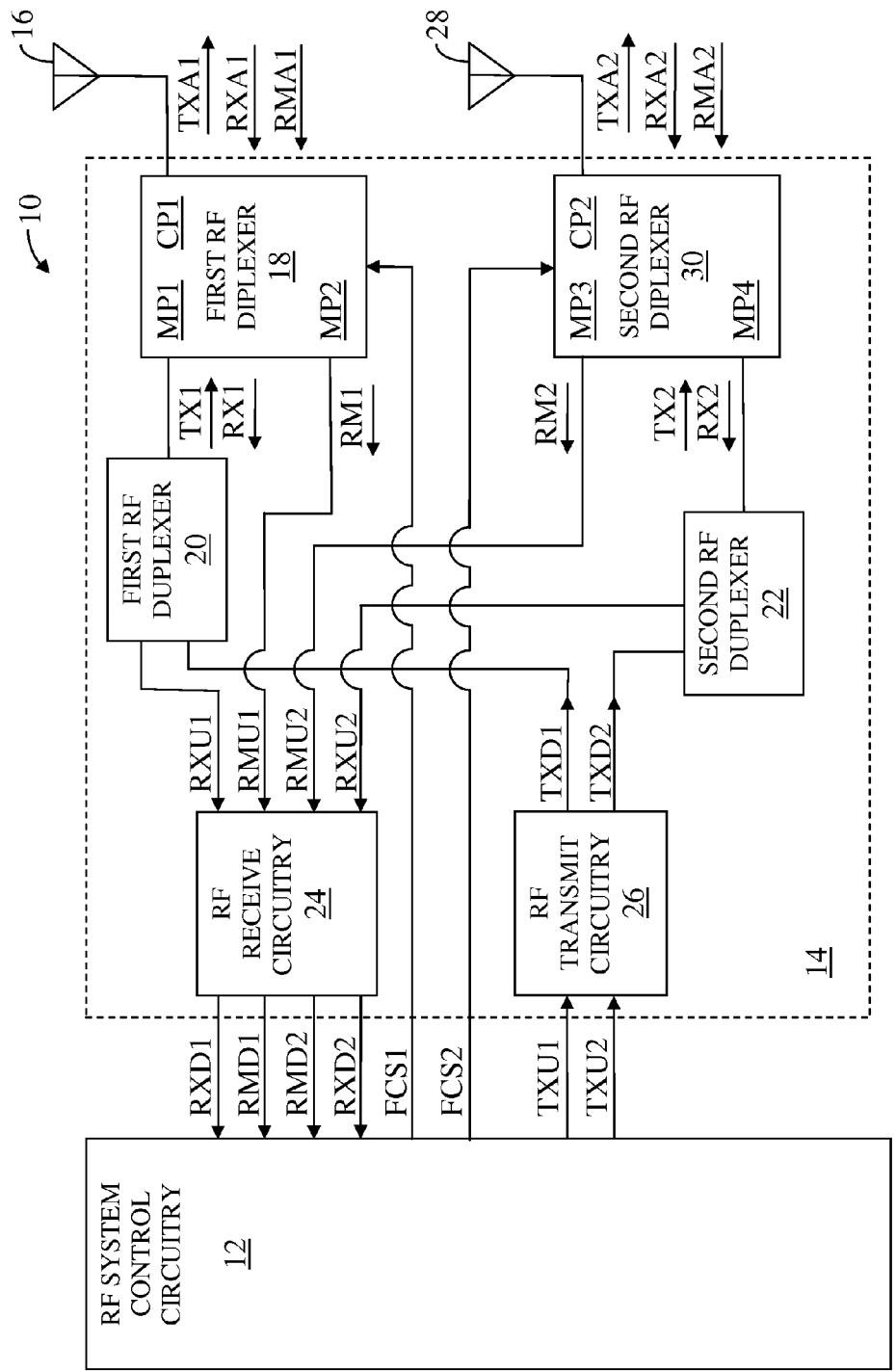
FIG. 2 shows the RF communications circuitry according to an alternate embodiment of the RF communications circuitry.

FIG. 2 shows RF communications circuitry 10 according to an alternate embodiment of the RF communications circuitry 10. The RF communications circuitry 10 illustrated in FIG. 2 is similar to the RF communications circuitry 10 illustrated in FIG. 1, except the RF communications circuitry 10 illustrated in FIG. 2 further includes an auxiliary RF antenna 28 and the RF front-end circuitry 14 illustrated in FIG. 2 further includes a second RF diplexer 30.

The second RF diplexer 30 has a second common port CP2, a third main port MP3, and a fourth main port MP4. In one embodiment of the second RF diplexer 30, the second RF diplexer 30 functions similarly to the first RF diplexer 18. As such, the second common port CP2 functions similarly to the first common port CP1. The third main port MP3 functions similarly to the first main port MP1. The fourth main port MP4 functions similarly to the second main port MP2. Therefore, in one embodiment of the second RF diplexer 30, RF signals at the third main port MP3 are associated with one RF communications band, and RF signals at the fourth main port MP4 are associated with another RF communications band. Therefore, RF signals at the second common port CP2 may be associated with both RF communications bands.

In this regard, in one embodiment of the second RF diplexer 30, signals at the third main port MP3 are associated with the highband RF communications band and signals at the fourth main port MP4 are associated with the lowband RF communications band. Therefore, signals at the second common port CP2 may be associated with the highband RF communications band, the lowband RF communications band, or both.

The auxiliary RF antenna 28 is coupled to the second common port CP2. The second RF duplexer 22 is coupled to the fourth main port MP4 instead of being coupled to the second main port MP2. As such, the second RF transmit signal TX2 and the second RF receive signal RX2 are associated with the fourth main port MP4 instead of being associated with the second main port MP2. As a result, the second RF antenna transmit signal TXA2 and the second RF antenna receive signal RXA2 are associated with the auxiliary RF antenna 28 instead of being associated with the primary RF antenna 16. By moving the second RF antenna transmit signal TXA2 and the second RF antenna receive signal RXA2 to the auxiliary RF antenna 28, the isolation requirements between the first main port MP1 and the fourth main port MP4 may be relaxed due to isolation between the primary RF antenna 16 and the auxiliary RF antenna 28.

For example, in one embodiment of the RF communications circuitry 10 illustrated in FIG. 1, the first RF diplexer 18 provided at least 37 dB of isolation between the first RF transmit signal TX1 and the second RF receive signal RX2, and further provided at least 37 dB of isolation between the second RF transmit signal TX2 and the first RF receive signal RX1. However, with the second RF transmit signal TX2 and the second RF receive signal RX2 being associated with the fourth main port MP4 instead of being associated with the second main port MP2, if there is 10 dB of isolation between the primary RF antenna 16 and the auxiliary RF antenna 28, the isolation requirements between the first main port MP1 and the second main port MP2 is relaxed to 27 dB, and the isolation requirements between the third main port MP3 and the fourth main port MP4 is also relaxed to 27 dB.

Receive multiple-input multiple-output (MIMO) is a technique that uses multiple RF antennas to simultaneously receive RF receive signals in the same RF communications band. By receiving that same information using multiple receive signals, overall RF receive performance may be increased.

As such, in one embodiment of the first RF diplexer 18, the first RF diplexer 18 receives and forwards a first RF MIMO antenna receive signal RMA1 via the primary RF antenna 16 to the second main port MP2 to provide a first RF MIMO receive signal RM1, which is a first upstream RF MIMO receive signal RMU1. The RF receive circuitry 24 receives and processes the first upstream RF MIMO receive signal RMU1 to provide a first downstream RF MIMO receive signal RMD1 to the RF system control circuitry 12. Additionally, the second RF diplexer 30 receives and forwards a second RF MIMO antenna receive signal RMA2 via the auxiliary RF antenna 28 to the third main port MP3 to provide a second RF MIMO receive signal RM2, which is a second upstream RF MIMO receive signal RMU2. The RF receive circuitry 24 receives and processes the second upstream RF MIMO receive signal RMU2 to provide a second downstream RF MIMO receive signal RMD2 to the RF system control circuitry 12.

In one embodiment of the first RF MIMO antenna receive signal RMA1 and the first RF MIMO receive signal RM1, the first RF MIMO antenna receive signal RMA1 is a lowband RF MIMO antenna receive signal and the first RF MIMO receive signal RM1 is a lowband RF MIMO receive signal. In one embodiment of the second RF MIMO antenna receive signal RMA2 and the second RF MIMO receive signal RM2, the second RF MIMO antenna receive signal RMA2 is a highband RF MIMO antenna receive signal and the second RF MIMO receive signal RM2 is a highband RF MIMO receive signal.

In one embodiment of the RF system control circuitry 12 and the second RF diplexer 30, the RF system control circuitry 12 provides a second function configuration signal FCS2 to the second RF diplexer 30. As such, the RF system control circuitry 12 may configure, tune, adjust, enable, disable, vary, or any combination thereof, circuits (not shown) within the second RF diplexer 30 as necessary using the second function configuration signal FCS2.

Figure 3:
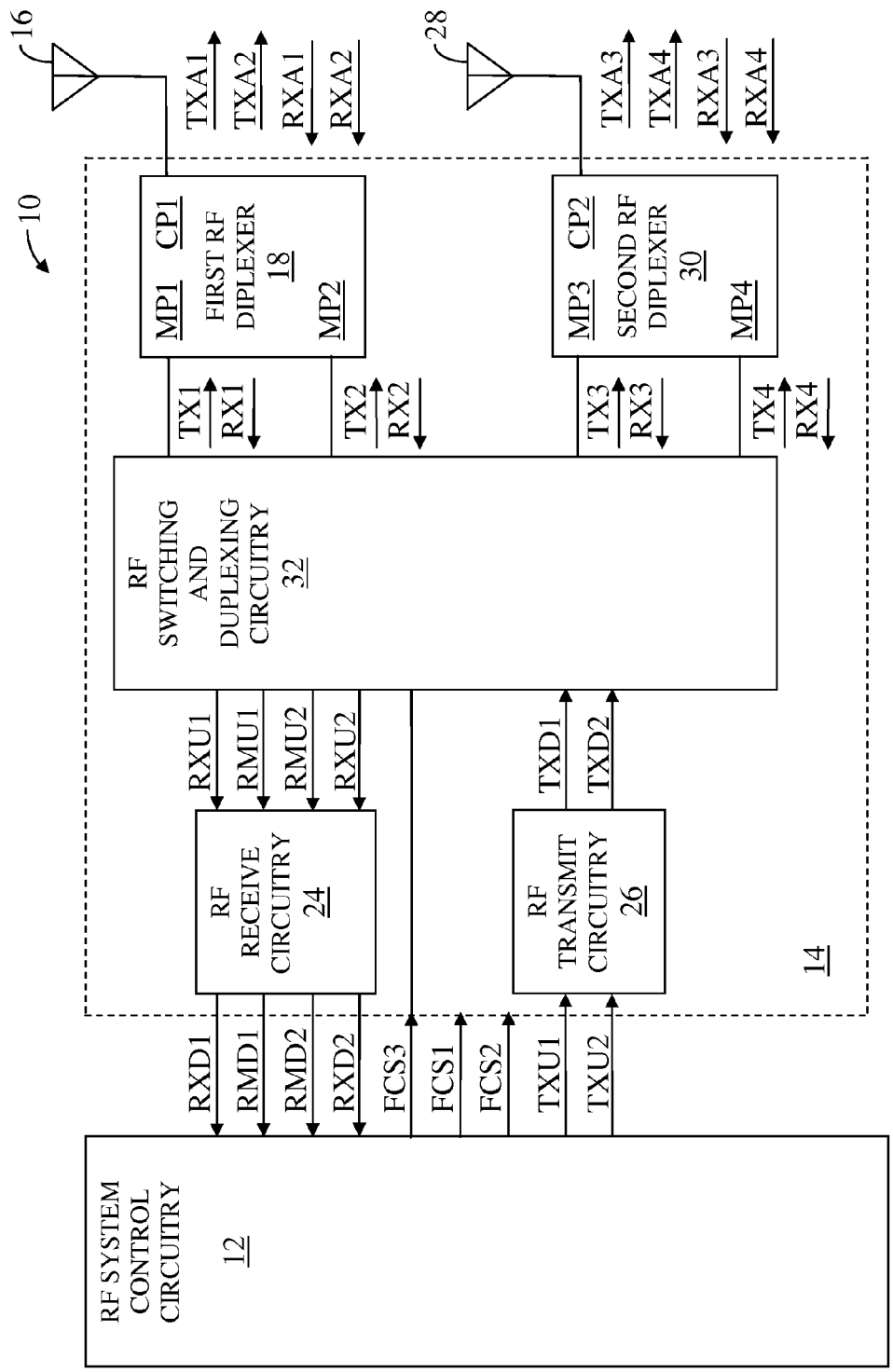
FIG. 3 shows the RF communications circuitry according to an additional embodiment of the RF communications circuitry.

FIG. 3 shows RF communications circuitry 10 according to an additional embodiment of the RF communications circuitry 10. The RF communications circuitry 10 illustrated in FIG. 3 is similar to the RF communications circuitry 10 illustrated in FIG. 2, except in the RF communications circuitry 10 illustrated in FIG. 3, the first RF duplexer 20 and the second RF duplexer 22 are omitted, and the RF front-end circuitry 14 further includes RF switching and duplexing circuitry 32. The RF switching and duplexing circuitry 32 is coupled between the RF receive circuitry 24 and the first RF diplexer 18, between the RF receive circuitry 24 and the second RF diplexer 30, between the RF transmit circuitry 26 and the first RF diplexer 18, and between the RF transmit circuitry 26 and the second RF diplexer 30.

The RF switching and duplexing circuitry 32 includes multiple RF duplexers (not shown) and multiple RF switches (not shown). As such, the RF switching and duplexing circuitry 32 is used to receive, filter, and forward RF signals TXD1, TXD2 from the RF transmit circuitry 26 to the first RF diplexer 18, to the second RF diplexer 30, or both. Additionally, the RF switching and duplexing circuitry 32 is used to receive, filter, and forward RF signals from the first RF diplexer 18, from the second RF diplexer 30, or both to provide RF signals RXU1, RXU2, RMU1, RMU2 to the RF receive circuitry 24.

In one embodiment of the RF system control circuitry 12 and the RF switching and duplexing circuitry 32, the RF system control circuitry 12 provides a third function configuration signal FCS3 to the RF switching and duplexing circuitry 32, such that signal routing within the RF switching and duplexing circuitry 32, duplexer selection within the RF switching and duplexing circuitry 32, duplexer tuning within the RF switching and duplexing circuitry 32, or any combination thereof are based on the third function configuration signal FCS3.

If the RF switching and duplexing circuitry 32 is configured to provide the first RF transmit signal TX1, the first RF diplexer 18 receives and forwards the first RF transmit signal TX1 via the first main port MP1 to the first common port CP1 to provide the first RF antenna transmit signal TXA1. In one embodiment of the first RF transmit signal TX1, the first RF transmit signal TX1 is the highband RF transmit signal. In one embodiment of the first RF antenna transmit signal TXA1, the first RF antenna transmit signal TXA1 is the highband RF antenna transmit signal.

If the RF switching and duplexing circuitry 32 is configured to provide the second RF transmit signal TX2, the first RF diplexer 18 receives and forwards the second RF transmit signal TX2 via the second main port MP2 to the first common port CP1 to provide the second RF antenna transmit signal TXA2. In one embodiment of the second RF transmit signal TX2, the second RF transmit signal TX2 is the lowband RF transmit signal. In one embodiment of the second RF antenna transmit signal TXA2, the second RF antenna transmit signal TXA2 is the lowband RF antenna transmit signal.

If the RF switching and duplexing circuitry 32 is configured to receive the first RF receive signal RX1, the first RF diplexer 18 receives and forwards the first RF antenna receive signal RXA1 via the primary RF antenna 16 to the first main port MP1 to provide the first RF receive signal RX1. In one embodiment of the first RF antenna receive signal RXA1, the first RF antenna receive signal RXA1 is the highband RF antenna receive signal. In one embodiment of the first RF receive signal RX1, the first RF receive signal RX1 is the highband RF receive signal. In an alternate embodiment of the first RF antenna receive signal RXA1, the first RF antenna receive signal RXA1 is the highband RF MIMO antenna receive signal. In an alternate embodiment of the first RF receive signal RX1, the first RF receive signal RX1 is the highband RF MIMO receive signal.

If the RF switching and duplexing circuitry 32 is configured to receive the second RF receive signal RX2, the first RF diplexer 18 receives and forwards the second RF antenna receive signal RXA2 via the primary RF antenna 16 to the second main port MP2 to provide the second RF receive signal RX2. In one embodiment of the second RF antenna receive signal RXA2, the second RF antenna receive signal RXA2 is the lowband RF antenna receive signal. In one embodiment of the second RF receive signal RX2, the second RF receive signal RX2 is the lowband RF receive signal. In an alternate embodiment of the second RF antenna receive signal RXA2, the second RF antenna receive signal RXA2 is the lowband RF MIMO antenna receive signal. In an alternate embodiment of the second RF receive signal RX2, the second RF receive signal RX2 is the lowband RF MIMO receive signal.

If the RF switching and duplexing circuitry 32 is configured to provide a third RF transmit signal TX3, the second RF diplexer 30 receives and forwards the third RF transmit signal TX3 via the third main port MP3 to the second common port CP2 to provide a third RF antenna transmit signal TXA3. In one embodiment of the third RF transmit signal TX3, the third RF transmit signal TX3 is the highband RF transmit signal. In one embodiment of the third RF antenna transmit signal TXA3, the third RF antenna transmit signal TXA3 is the highband RF antenna transmit signal.

If the RF switching and duplexing circuitry 32 is configured to provide a fourth RF transmit signal TX4, the second RF diplexer 30 receives and forwards the fourth RF transmit signal TX4 via the fourth main port MP4 to the second common port CP2 to provide a fourth RF antenna transmit signal TXA4. In one embodiment of the fourth RF transmit signal TX4, the fourth RF transmit signal TX4 is the lowband RF transmit signal. In one embodiment of the fourth RF antenna transmit signal TXA4, the fourth RF antenna transmit signal TXA4 is the lowband RF antenna transmit signal.

If the RF switching and duplexing circuitry 32 is configured to receive a third RF receive signal RX3, the second RF diplexer 30 receives and forwards a third RF antenna receive signal RXA3 via the auxiliary RF antenna 28 to the third main port MP3 to provide a third RF receive signal RX3. In one embodiment of the third RF antenna receive signal RXA3, the third RF antenna receive signal RXA3 is the highband RF antenna receive signal. In one embodiment of the third RF receive signal RX3, the third RF receive signal RX3 is the highband RF receive signal. In an alternate embodiment of the third RF antenna receive signal RXA3, the third RF antenna receive signal RXA3 is the highband RF MIMO antenna receive signal. In an alternate embodiment of the third RF receive signal RX3, the third RF receive signal RX3 is the highband RF MIMO receive signal.

If the RF switching and duplexing circuitry 32 is configured to receive the fourth RF receive signal RX4, the second RF diplexer 30 receives and forwards the fourth RF antenna receive signal RXA4 via the auxiliary RF antenna 28 to the fourth main port MP4 to provide the fourth RF receive signal RX4. In one embodiment of the fourth RF antenna receive signal RXA4, the fourth RF antenna receive signal RXA4 is the lowband RF antenna receive signal. In one embodiment of the fourth RF receive signal RX4, the fourth RF receive signal RX4 is the lowband RF receive signal. In an alternate embodiment of the fourth RF antenna receive signal RXA4, the fourth RF antenna receive signal RXA4 is the lowband RF MIMO antenna receive signal. In an alternate embodiment of the fourth RF receive signal RX4, the fourth RF receive signal RX4 is the lowband RF MIMO receive signal.

The first RF diplexer 18 is coupled between the RF switching and duplexing circuitry 32 and the primary RF antenna 16. The second RF diplexer 30 is coupled between the RF switching and duplexing circuitry 32 and the auxiliary RF antenna 28. The RF system control circuitry 12 selects one of a group of RF transmit modes. As such, the RF switching and duplexing circuitry 32 operates in the selected one of the group of RF transmit modes. In one embodiment of the group of RF transmit modes, the group of RF transmit modes includes at least one transmit uplink carrier aggregation mode. The RF switching and duplexing circuitry 32 provides at least one RF transmit signal based on the selected one of the group of RF transmit modes. The RF system control circuitry 12 provides the first function configuration signal FCS1, the second function configuration signal FCS2, and the third function configuration signal FCS3 based on the selected one of the group of RF transmit modes.

In one embodiment of the RF system control circuitry 12, the RF system control circuitry 12 selects one of a group of RF receive modes. As such, the RF switching and duplexing circuitry 32 operates in the selected one of the group of RF receive modes. In one embodiment of the RF system control circuitry 12, the RF system control circuitry 12 simultaneously selects the one of the group of RF receive modes and the one of the group of RF transmit modes. As such, the RF switching and duplexing circuitry 32 simultaneously operates in the selected one of the group of RF receive modes and the selected one of the group of RF transmit modes.

In one embodiment of the group of RF transmit modes, the one transmit uplink carrier aggregation mode is a single antenna first RF diplexer transmit mode, such that during the single antenna first RF diplexer transmit mode, the RF switching and duplexing circuitry 32 provides a highband RF antenna transmit signal to the primary RF antenna 16 via the first RF diplexer 18 and further provides a lowband RF antenna transmit signal to the primary RF antenna 16 via the first RF diplexer 18.

In an alternate embodiment of the group of RF transmit modes, the one transmit uplink carrier aggregation mode is a single antenna second RF diplexer transmit mode, such that during the single antenna second RF diplexer transmit mode, the RF switching and duplexing circuitry 32 provides a highband RF antenna transmit signal to the auxiliary RF antenna 28 via the second RF diplexer 30 and further provides a lowband RF antenna transmit signal to the auxiliary RF antenna 28 via the second RF diplexer 30.

In an additional embodiment of the group of RF transmit modes, the one transmit uplink carrier aggregation mode is a dual antenna first RF diplexer transmit mode, such that during the dual antenna first RF diplexer transmit mode, the RF switching and duplexing circuitry 32 provides a highband RF antenna transmit signal to the primary RF antenna 16 via the first RF diplexer 18 and further provides a lowband RF antenna transmit signal to the auxiliary RF antenna 28 via the second RF diplexer 30.

In another embodiment of the group of RF transmit modes, the one transmit uplink carrier aggregation mode is a dual antenna second RF diplexer transmit mode, such that during the dual antenna second RF diplexer transmit mode, the RF switching and duplexing circuitry 32 provides a lowband RF antenna transmit signal to the primary RF antenna 16 via the first RF diplexer 18 and further provides a highband RF antenna transmit signal to the auxiliary RF antenna 28 via the second RF diplexer 30.

In one embodiment of the group of RF transmit modes, the group of RF transmit modes further includes a single highband transmit signal, first RF diplexer transmit mode, such that during the single highband transmit signal, first RF diplexer transmit mode, the RF switching and duplexing circuitry 32 provides a highband RF antenna transmit signal to the primary RF antenna 16 via the first RF diplexer 18.

In an alternate embodiment of the group of RF transmit modes, the group of RF transmit modes further includes a single lowband transmit signal, first RF diplexer transmit mode, such that during the single lowband transmit signal, first RF diplexer transmit mode, the RF switching and duplexing circuitry 32 provides a lowband RF antenna transmit signal to the primary RF antenna 16 via the first RF diplexer 18.

In an additional embodiment of the group of RF transmit modes, the group of RF transmit modes further includes a single highband transmit signal, second RF diplexer transmit mode, such that during the single highband transmit signal, second RF diplexer transmit mode, the RF switching and duplexing circuitry 32 provides a highband RF antenna transmit signal to the auxiliary RF antenna 28 via the second RF diplexer 30.

In another embodiment of the group of RF transmit modes, the group of RF transmit modes further includes a single lowband transmit signal, second RF diplexer transmit mode, such that during the single lowband transmit signal, second RF diplexer transmit mode, the RF switching and duplexing circuitry 32 provides a lowband RF antenna transmit signal to the auxiliary RF antenna 28 via the second RF diplexer 30.

In one embodiment of the group of RF receive modes, the group of RF receive modes includes a group of receive downlink carrier aggregation modes. In one embodiment of the group of receive downlink carrier aggregation modes, the group of receive downlink carrier aggregation modes includes a single antenna first RF diplexer receive mode, such that during the single antenna first RF diplexer receive mode, the RF switching and duplexing circuitry 32 receives a highband RF antenna receive signal from the primary RF antenna 16 via the first RF diplexer 18 and further receives a lowband RF antenna transmit signal from the primary RF antenna 16 via the first RF diplexer 18.

In an alternate embodiment of the group of receive downlink carrier aggregation modes, the group of receive downlink carrier aggregation modes includes a single antenna second RF diplexer receive mode, such that during the single antenna second RF diplexer receive mode, the RF switching and duplexing circuitry 32 receives a highband RF antenna receive signal from the auxiliary RF antenna 28 via the second RF diplexer 30 and further receives a lowband RF antenna transmit signal from the auxiliary RF antenna 28 via the second RF diplexer 30.

In an additional embodiment of the group of receive downlink carrier aggregation modes, the group of receive downlink carrier aggregation modes includes a dual antenna first RF diplexer receive mode, such that during the dual antenna first RF diplexer receive mode, the RF switching and duplexing circuitry 32 receives a highband RF antenna receive signal from the primary RF antenna 16 via the first RF diplexer 18 and further receives a lowband RF antenna receive signal from the auxiliary RF antenna 28 via the second RF diplexer 30.

In another embodiment of the group of receive downlink carrier aggregation modes, the group of receive downlink carrier aggregation modes includes a dual antenna second RF diplexer receive mode, such that during the dual antenna second RF diplexer receive mode, the RF switching and duplexing circuitry 32 receives a lowband RF antenna receive signal from the primary RF antenna 16 via the first RF diplexer 18 and further receives a highband RF antenna receive signal from the auxiliary RF antenna 28 via the second RF diplexer 30.

In one embodiment of the group of RF receive modes, the group of RF receive modes includes a highband receive signal, lowband MIMO receive signal mode, such that during the highband receive signal, lowband MIMO receive signal mode, the RF switching and duplexing circuitry 32 receives a highband RF antenna receive signal and further receives a lowband RF MIMO antenna receive signal.

In one embodiment of the group of RF receive modes, the group of RF receive modes includes a lowband receive signal, highband MIMO receive signal mode, such that during the lowband receive signal, highband MIMO receive signal mode, the RF switching and duplexing circuitry 32 receives a lowband RF antenna receive signal and further receives a highband RF MIMO antenna receive signal.

Figure 4:
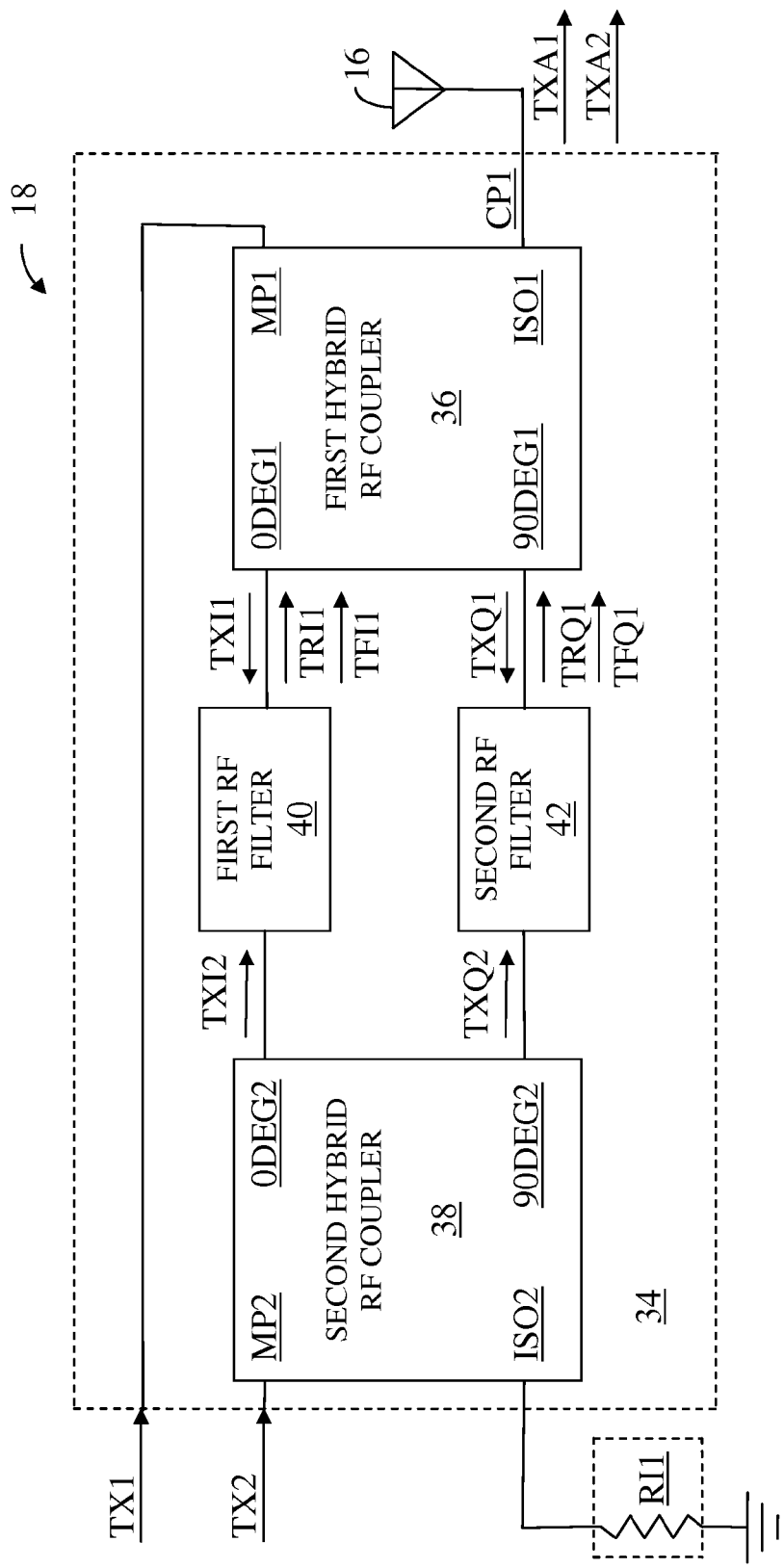
FIG. 4 shows details of a first RF diplexer illustrated in FIG. 1 according to one embodiment of the first RF diplexer.

FIG. 4 shows details of the first RF diplexer 18 illustrated in FIG. 1 according to one embodiment of the first RF diplexer 18. The first RF diplexer 18 illustrated in FIG. 4 is a first high linearity RF diplexer 34. The first high linearity RF diplexer 34 includes a first hybrid RF coupler 36, a second hybrid RF coupler 38, a first RF filter 40, and a second RF filter 42. The first high linearity RF diplexer 34 has a first common port CP1.

The first hybrid RF coupler 36 has a first main port MP1, a first in-phase port 0DEG1, a first quadrature-phase port 90DEG1, and a first isolation port ISO1, which functions as the first common port CP1. The first isolation port ISO1 is coupled to the primary RF antenna 16. The second hybrid RF coupler 38 has a second main port MP2, a second in-phase port 0DEG2, a second quadrature-phase port 90DEG2, and a second isolation port ISO2. A first isolation port resistive element RI1 is coupled between the second isolation port ISO2 and ground. In one embodiment of the first isolation port resistive element RI1, the first isolation port resistive element RI1 is adjusted to compensate for an impedance mismatch between the primary RF antenna 16 and the first isolation port ISO1.

The first RF filter 40 is coupled between the first in-phase port 0DEG1 and the second in-phase port 0DEG2. The second RF filter 42 is coupled between the first quadrature-phase port 90DEG1 and the second quadrature-phase port 90DEG2. The first hybrid RF coupler 36 receives the first RF transmit signal TX1, which is a highband RF transmit signal, via the first main port MP1. The first hybrid RF coupler 36 receives, splits, and phase-shifts the highband RF transmit signal to provide a first in-phase RF transmit signal TXI1 via the first in-phase port 0DEG1 and further provide a first quadrature-phase RF transmit signal TXQ1 via the first quadrature-phase port 90DEG1.

The first RF filter 40 and the second RF filter 42 each present a substantially high impedance to the first in-phase RF transmit signal TXI1 and the first quadrature-phase RF transmit signal TXQ1, respectively. As a result, the first in-phase RF transmit signal TXI1 and the first quadrature-phase RF transmit signal TXQ1 are substantially reflected by the first RF filter 40 and the second RF filter 42, respectively, to provide a first reflected in-phase RF transmit signal TRI1 and a first reflected quadrature-phase RF transmit signal TRQ1, respectively. The first hybrid RF coupler 36 receives, phase-shifts, and the combines the first reflected in-phase RF transmit signal TRI1 and the first reflected quadrature-phase RF transmit signal TRQ1, respectively, via the first in-phase port 0DEG1 and the first quadrature-phase port 90DEG1, respectively, to provide a first RF antenna transmit signal TXA1, which is a highband RF antenna transmit signal, via the first isolation port ISO1.

In one embodiment of the first hybrid RF coupler 36, the first hybrid RF coupler 36 is a tunable hybrid RF coupler, such that the first hybrid RF coupler 36 is tuned based on the first function configuration signal FCS1. As such, in one embodiment of the first in-phase RF transmit signal TXI1 and the first quadrature-phase RF transmit signal TXQ1, the first hybrid RF coupler 36 is tuned, such that the first quadrature-phase RF transmit signal TXQ1 is phase-shifted from the first in-phase RF transmit signal TXI1 by approximately 90 degrees.

The second hybrid RF coupler 38 receives the second RF transmit signal TX2, which is a lowband RF transmit signal, via the second main port MP2. The second hybrid RF coupler 38 receives, splits, and phase-shifts the lowband RF transmit signal to provide a second in-phase RF transmit signal TXI2 via the second in-phase port 0DEG2 and further provide a second quadrature-phase RF transmit signal TXQ2 via the second quadrature-phase port 90DEG2. The first RF filter 40 receives and filters the second in-phase RF transmit signal TXI2 to provide a first filtered in-phase RF transmit signal TFI1. The second RF filter 42 receives and filters the second quadrature-phase RF transmit signal TXQ2 to provide a first filtered quadrature-phase RF transmit signal TFQ1.

The first hybrid RF coupler 36 receives, phase-shifts, and then combines the first filtered in-phase RF transmit signal TFI1 and the first filtered quadrature-phase RF transmit signal TFQ1, respectively, via the first in-phase port 0DEG1 and the first quadrature-phase port 90DEG1, respectively, to provide a second RF antenna transmit signal TXA2, which is a lowband RF antenna transmit signal, via the first isolation port ISO1.

In one embodiment of the second hybrid RF coupler 38, the second hybrid RF coupler 38 is a tunable hybrid RF coupler, such that the second hybrid RF coupler 38 is tuned based on the first function configuration signal FCS1. As such, in one embodiment of the second in-phase RF transmit signal TXI2 and the second quadrature-phase RF transmit signal TXQ2, the second hybrid RF coupler 38 is tuned, such that the second quadrature-phase RF transmit signal TXQ2 is phase-shifted from the second in-phase RF transmit signal TXI2 by approximately 90 degrees.

In one embodiment of the first high linearity RF diplexer 34, the first high linearity RF diplexer 34 provides the highband RF transmit signal and the lowband RF transmit signal simultaneously. As such, the highband RF transmit signal and the lowband RF transmit signal are TXULCA signals. In one embodiment of the first high linearity RF diplexer 34, each of the first RF filter 40 and the second RF filter 42 process both highband RF signals and lowband RF signals. Mixing effects of these RF signals may produce intermodulation signals from each of the first RF filter 40 and the second RF filter 42. However, the phase-shifts provided by the first hybrid RF coupler 36 and the second hybrid RF coupler 38 may substantially reduce such mixing effects, thereby increasing isolation between the first main port MP1 and the second main port MP2.

In this regard, in one embodiment of the first high linearity RF diplexer 34, during TXULCA, the highband RF transmit signal is substantially isolated from the second main port MP2 and the lowband RF transmit signal is substantially isolated from the first main port MP1. In an exemplary embodiment of the first high linearity RF diplexer 34, during TXULCA, the highband RF transmit signal is isolated from the second main port MP2 by at least 37 dB and the lowband RF transmit signal is isolated from the first main port MP1 by at least 37 dB. As such, isolation provides high linearity for the first high linearity RF diplexer 34. In one embodiment of the first high linearity RF diplexer 34, the first hybrid RF coupler 36 and the second hybrid RF coupler 38 substantially reduce third order mixing effects produced by the first RF filter 40 and the second RF filter 42.

Figure 5:
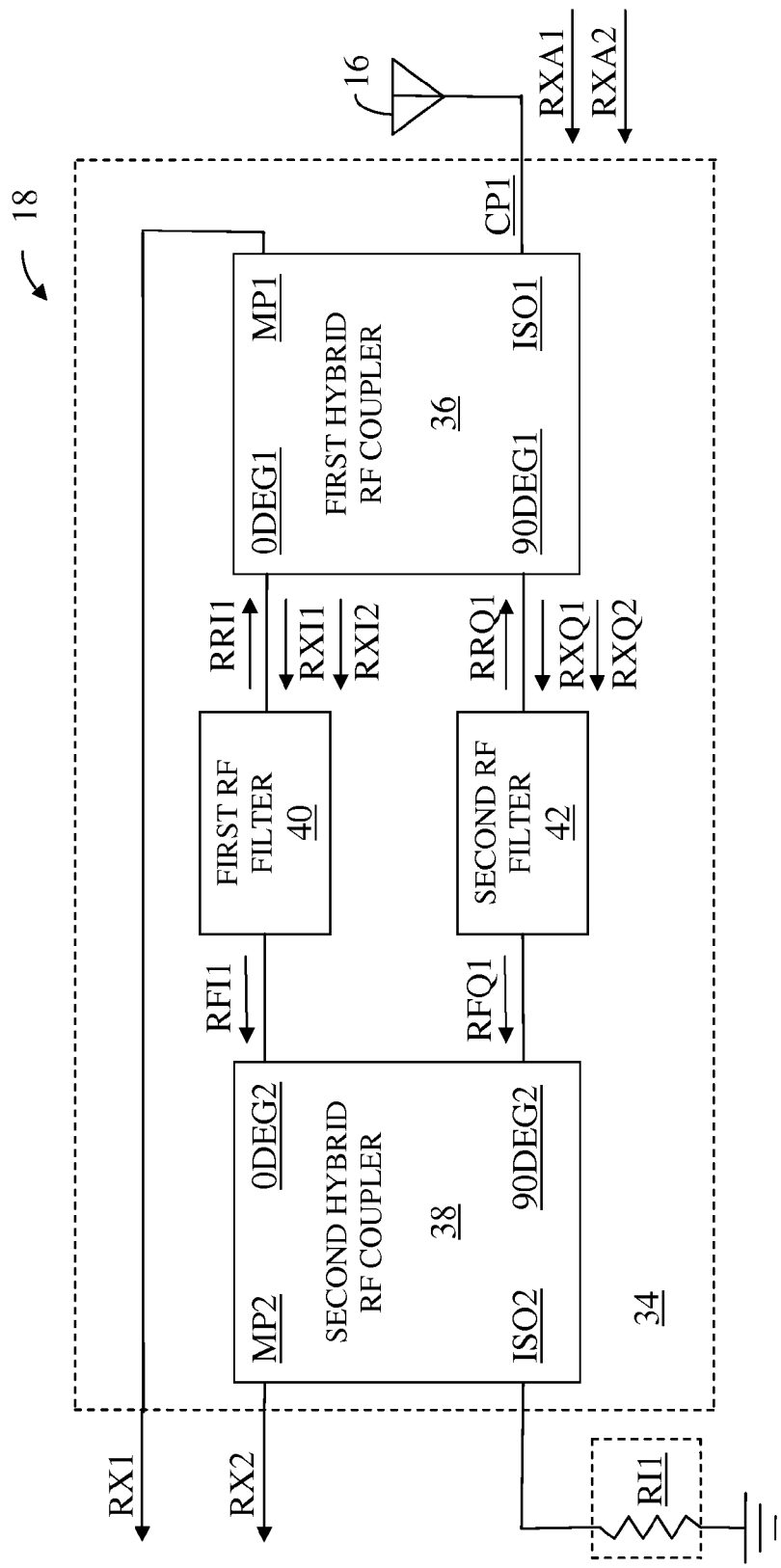
FIG. 5 shows details of the first RF diplexer illustrated in FIG. 1 according to an alternate embodiment of the first RF diplexer.

FIG. 5 shows details of the first RF diplexer 18 illustrated in FIG. 1 according to an alternate embodiment of the first RF diplexer 18. The first RF diplexer 18 illustrated in FIG. 5 is similar to the first RF diplexer 18 illustrated in FIG. 4, except the first RF diplexer 18 shown in FIG. 4 illustrates RF transmit signals being sent to the primary RF antenna 16 and the first RF diplexer 18 illustrated in FIG. 5 illustrates RF receive signals being provided by the primary RF antenna 16.

The first hybrid RF coupler 36 receives, splits, and phase-shifts a first RF antenna receive signal RXA1, which is a highband RF antenna receive signal, via the first isolation port ISO1, to provide a first in-phase RF receive signal RXI1 via the first in-phase port 0DEG1, and further provide a first quadrature-phase RF receive signal RXQ1 via the first quadrature-phase port 90DEG1.

Additionally, the first hybrid RF coupler 36 receives, splits, and phase-shifts a second RF antenna receive signal RXA2, which is a lowband RF antenna receive signal, via the first isolation port ISO1, to provide a second in-phase RF receive signal RXI2 via the first in-phase port 0DEG1, and further provide a second quadrature-phase RF receive signal RXQ2 via the first quadrature-phase port 90DEG1.

The first RF filter 40 and the second RF filter 42 each present a substantially high impedance to the first in-phase RF receive signal RXI1 and the first quadrature-phase RF receive signal RXQ1, respectively. As a result, the first in-phase RF receive signal RXI1 and the first quadrature-phase RF receive signal RXQ1 are substantially reflected by the first RF filter 40 and the second RF filter 42, respectively, to provide a first reflected in-phase RF receive signal RRI1 and a first reflected quadrature-phase RF receive signal RRQ1, respectively. The first hybrid RF coupler 36 receives, phase-shifts, and then combines the first reflected in-phase RF receive signal RRI1 and the first reflected quadrature-phase RF receive signal RRQ1, respectively, via the first in-phase port 0DEG1 and the first quadrature-phase port 90DEG1, respectively, to provide the first RF receive signal RX1, which is a highband RF receive signal, via the first main port MP1.

The first RF filter 40 receives and filters the second in-phase RF receive signal RXI2 to provide a first filtered in-phase RF receive signal RFI1. The second RF filter 42 receives and filters the second quadrature-phase RF receive signal RXQ2 to provide a first filtered quadrature-phase RF receive signal RFQ1.

The second hybrid RF coupler 38 receives, phase-shifts, and then combines the first filtered in-phase RF receive signal RFI1 and the first filtered quadrature-phase RF receive signal RFQ1, respectively, via the second in-phase port 0DEG2 and the second quadrature-phase port 90DEG2, respectively, to provide the second RF receive signal RX2, which is a lowband RF receive signal, via the second main port MP2. In one embodiment of the first RF diplexer 18, the first RF diplexer 18 receives the highband RF antenna receive signal and the lowband RF antenna receive signal simultaneously, such that the highband RF antenna receive signal and the lowband RF antenna receive signal are RXDLCA signals.

In one embodiment of the first RF filter 40, a filter response of the first RF filter 40 to RF signals received from the first in-phase port 0DEG1 is approximately equal to a filter response of the first RF filter 40 to RF signals received from the second in-phase port 0DEG2, such that the first RF filter 40 has an approximately symmetrical filter response. In one embodiment of the second RF filter 42, a filter response of the second RF filter 42 to RF signals received from the first quadrature-phase port 90DEG1 is approximately equal to a filter response of the second RF filter 42 to RF signals received from the second quadrature-phase port 90DEG2, such that the second RF filter 42 has an approximately symmetrical filter response.

Figure 6:
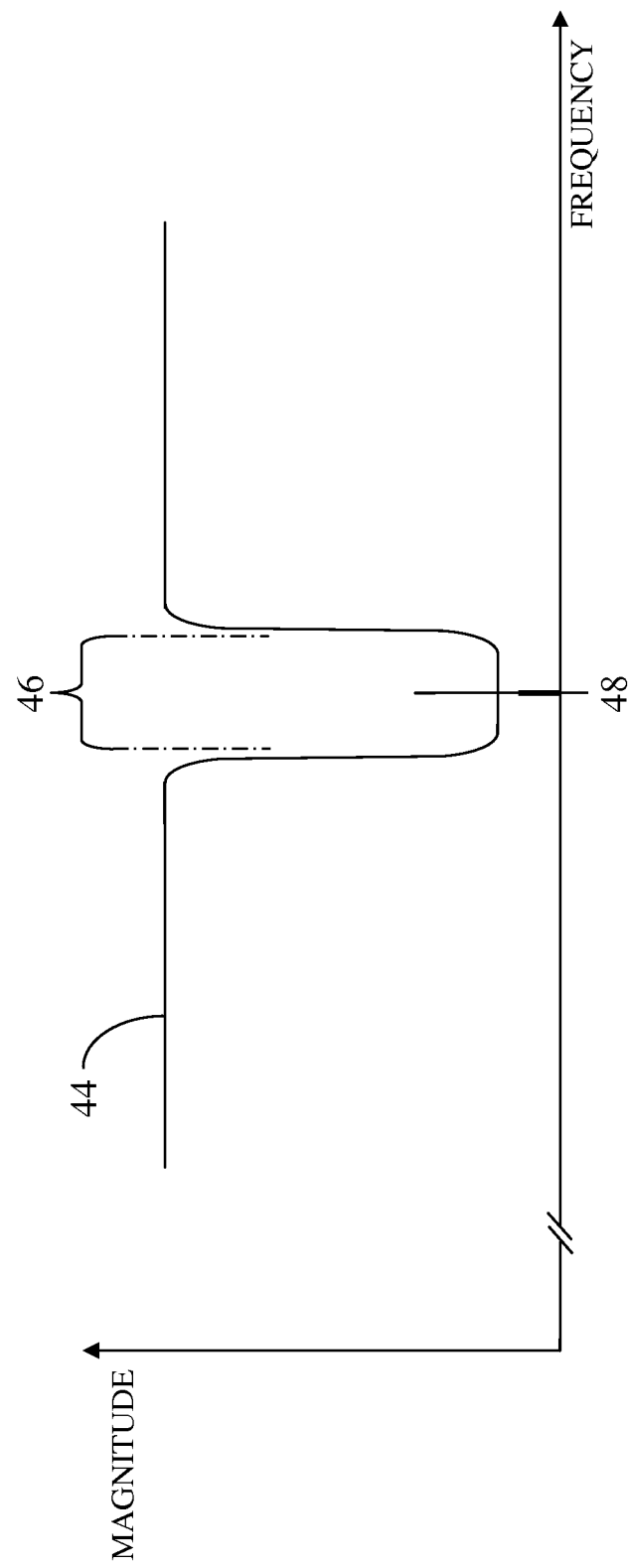
FIG. 6 is a graph illustrating a first bandstop filter frequency response curve of a first RF filter illustrated in FIG. 4 according to one embodiment of the first RF filter.

FIG. 6 is a graph illustrating a first bandstop filter frequency response curve 44 of the first RF filter 40 illustrated in FIG. 4 according to one embodiment of the first RF filter 40. The first RF filter 40 is a tunable RF bandstop filter having a first stopband 46 with a tunable center frequency 48. A highband RF communications band includes the highband RF transmit signal. In one embodiment of the first RF filter 40, the first RF filter 40 is tunable, such that the tunable center frequency 48 is about equal to a center frequency of the highband RF communications band.

In one embodiment of the second RF filter 42, the second RF filter 42 is similar to the first RF filter 40. In this regard, the second RF filter 42 is a tunable RF bandstop filter having a second stopband (not shown) with a tunable center frequency (not shown). In one embodiment of the second RF filter 42, the second RF filter 42 is tunable, such that the tunable center frequency of the second RF filter 42 is about equal to the center frequency of the highband RF communications band. In one embodiment of the first RF filter 40 and the second RF filter 42, both the first RF filter 40 and the second RF filter 42 are tuned based on the first function configuration signal FCS1.

Figure 7:
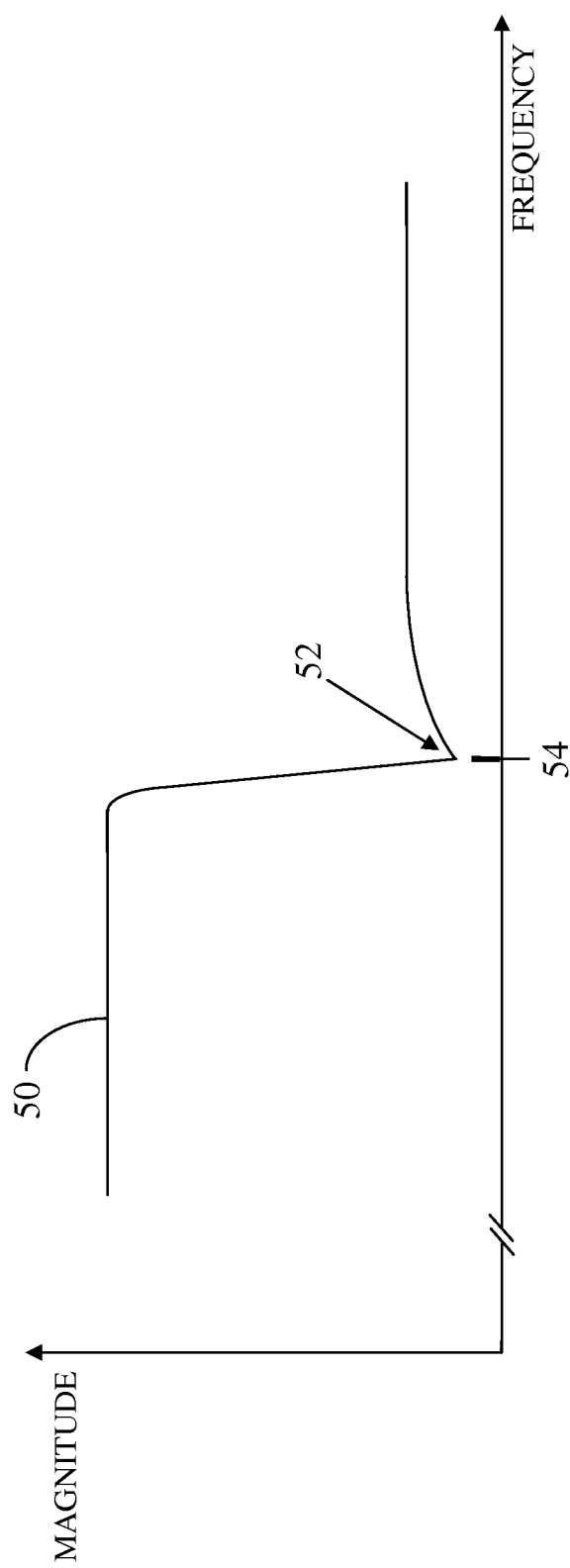
FIG. 7 is a graph illustrating a first tunable RF lowpass and notch filter response curve of the first RF filter illustrated in FIG. 4 according to an alternate embodiment of the first RF filter.

FIG. 7 is a graph illustrating a first tunable RF lowpass and notch filter response curve 50 of the first RF filter 40 illustrated in FIG. 4 according to an alternate embodiment of the first RF filter 40. The first RF filter 40 is a tunable RF lowpass and notch filter having a first tunable RF lowpass and notch filter response curve 50. The first RF filter 40 has a first tunable notch 52 with a first tunable notch frequency 54. A highband RF communications band includes the highband RF transmit signal. In one embodiment of the first RF filter 40, the first RF filter 40 is tunable, such that the first tunable notch frequency 54 is about equal to a frequency of the highband RF transmit signal.

Similarly, the second RF filter 42 is a tunable RF lowpass and notch filter having a second tunable RF lowpass and notch filter response curve. The second RF filter 42 has a second tunable notch with a second tunable notch frequency.

A highband RF communications band includes the highband RF transmit signal. In one embodiment of the second RF filter 42, the second RF filter 42 is tunable, such that the second tunable notch frequency is about equal to the frequency of the highband RF transmit signal. In one embodiment of the first RF filter 40 and the second RF filter 42, both the first RF filter 40 and the second RF filter 42 are tuned based on the first function configuration signal FCS1.

In one embodiment of the first tunable notch frequency 54, the first tunable notch frequency 54 is about equal to a harmonic of a frequency of the lowband RF transmit signal. In one embodiment of the second tunable notch frequency, the second tunable notch frequency is about equal to the harmonic of the frequency of the lowband RF transmit signal.

In one embodiment of the first tunable notch frequency 54, the first tunable notch frequency 54 is about equal to a frequency of the highband RF antenna receive signal. In one embodiment of the second tunable notch frequency, the second tunable notch frequency is about equal to the frequency of the highband RF antenna receive signal.

In one embodiment of the first tunable notch frequency 54, the first tunable notch frequency 54 is about equal to a frequency of the highband RF transmit signal. In one embodiment of the second tunable notch frequency, the second tunable notch frequency is about equal to the frequency of the highband RF transmit signal.

Figure 8:
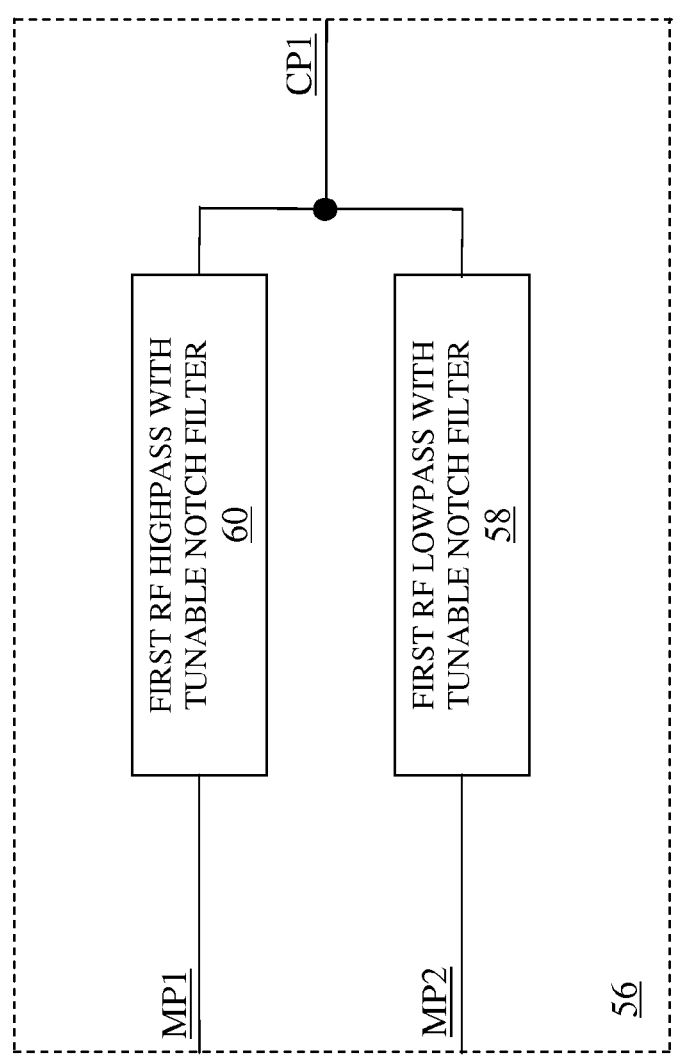
FIG. 8 shows details of the first RF diplexer illustrated in FIGS. 1 and 2 according to one embodiment of the first RF diplexer.

FIG. 8 shows details of the first RF diplexer 18 illustrated in FIGS. 1 and 2 according to one embodiment of the first RF diplexer 18. The first RF diplexer 18 illustrated in FIG. 8 is a first tunable RF diplexer 56 having the first main port MP1, the second main port MP2, and the first common port CP1. The first tunable RF diplexer 56 includes a first RF lowpass with tunable notch filter 58 and a first RF highpass with tunable notch filter 60.

The first RF lowpass with tunable notch filter 58 is coupled between the second main port MP2 and the first common port CP1. The first RF highpass with tunable notch filter 60 is coupled between the first main port MP1 and the first common port CP1. The first RF lowpass with tunable notch filter 58 has a first lowpass notch frequency, which is tunable. The first RF highpass with tunable notch filter 60 has a first highpass notch frequency, which is tunable. By tuning the first lowpass notch frequency and the first highpass notch frequency, the first main port MP1 may be substantially isolated from the second main port MP2.

Figure 9:
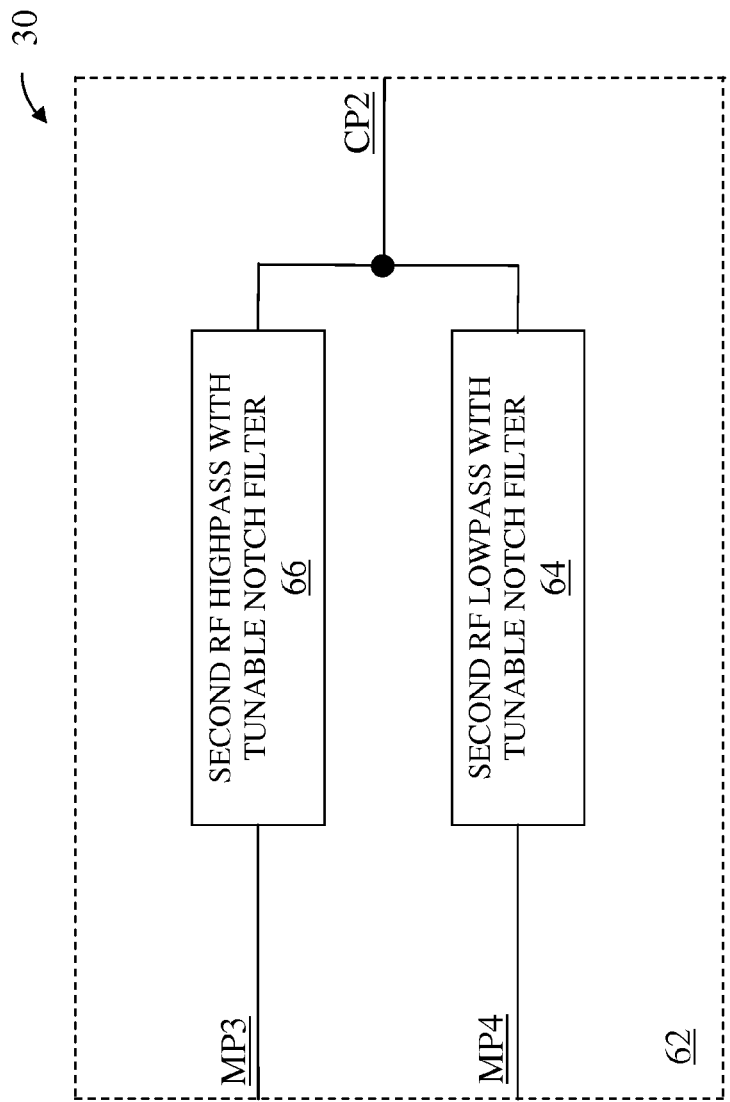
FIG. 9 shows details of a second RF diplexer illustrated in FIG. 2 according to one embodiment of the second RF diplexer.

FIG. 9 shows details of the second RF diplexer 30 illustrated in FIG. 2 according to one embodiment of the second RF diplexer 30. The second RF diplexer 30 illustrated in FIG. 9 is a second tunable RF diplexer 62 having the third main port MP3, the fourth main port MP4, and the second common port CP2. The second tunable RF diplexer 62 includes a second RF lowpass with tunable notch filter 64 and a second RF highpass with tunable notch filter 66.

The second RF lowpass with tunable notch filter 64 is coupled between the fourth main port MP4 and the second common port CP2. The second RF highpass with tunable notch filter 66 is coupled between the third main port MP3 and the second common port CP2. The second RF lowpass with tunable notch filter 64 has a second lowpass notch frequency, which is tunable. The second RF highpass with tunable notch filter 66 has a second highpass notch frequency, which is tunable. By tuning the second lowpass notch frequency and the second highpass notch frequency, the third main port MP3 may be substantially isolated from the fourth main port MP4.

In one embodiment of the first RF diplexer 18, the first RF diplexer 18 receives a highband RF transmit signal via the first main port MP1 to provide a highband RF antenna transmit signal via the first common port CP1. In one embodiment of the first RF diplexer 18, the first RF diplexer 18 receives a lowband RF transmit signal via the second main port MP2 to provide a lowband RF antenna transmit signal via the first common port CP1. In one embodiment of the first RF diplexer 18, the first RF diplexer 18 provides the lowband RF antenna transmit signal and the highband RF antenna transmit signal simultaneously, such that the lowband RF antenna transmit signal and the highband RF antenna transmit signal are Transmit Uplink Carrier Aggregation signals.

In one embodiment of the first RF diplexer 18, during Transmit Uplink Carrier Aggregation, the highband RF transmit signal is substantially isolated from the second main port MP2 and the lowband RF transmit signal is substantially isolated from the first main port MP1. In one embodiment of the first RF diplexer 18, during Transmit Uplink Carrier Aggregation, the first lowpass notch frequency is tuned to be about equal to a frequency of the highband RF transmit signal and the first highpass notch frequency is tuned to be about equal to a frequency of the lowband RF transmit signal.

In one embodiment of the first RF diplexer 18, the first RF diplexer 18 receives a highband RF antenna receive signal via the first common port CP1 to provide a highband RF receive signal via the first main port MP1. In one embodiment of the first RF diplexer 18, the first RF diplexer 18 receives a lowband RF antenna receive signal via the first common port CP1 to provide a lowband RF receive signal via the second main port MP2. In one embodiment of the first RF diplexer 18, the first RF diplexer 18 receives the lowband RF antenna receive signal and the highband RF antenna receive signal simultaneously, such that the lowband RF antenna receive signal and the highband RF antenna receive signal are Receive Downlink Carrier Aggregation signals.

In one embodiment of the first RF diplexer 18, during Receive Downlink Carrier Aggregation, the first RF diplexer 18 receives a highband RF transmit signal via the first main port MP1 to provide a highband RF antenna transmit signal via the first common port CP1. In one embodiment of the first RF diplexer 18, during the Receive Downlink Carrier Aggregation, the first lowpass notch frequency is tuned to be about equal to a frequency of the highband RF transmit signal and the first highpass notch frequency is tuned to be about equal to a frequency of a lowband RF antenna receive signal.

In one embodiment of the first RF diplexer 18, during the Receive Downlink Carrier Aggregation, the first lowpass notch frequency is tuned to be about equal to a frequency of a highband RF antenna receive signal and the first highpass notch frequency is tuned to be about equal to a frequency of a lowband RF antenna receive signal. In one embodiment of the first RF diplexer 18, during Receive Downlink Carrier Aggregation, the first RF diplexer 18 receives a lowband RF transmit signal via the second main port MP2 to provide a lowband RF antenna transmit signal via the first common port CP1.

In one embodiment of the first RF diplexer 18, during the Receive Downlink Carrier Aggregation, the first lowpass notch frequency is tuned to be about equal to a harmonic of a frequency of the lowband RF transmit signal and the first highpass notch frequency is tuned to be about equal to a frequency of a highband RF antenna receive signal. In one embodiment of the first RF diplexer 18, during the Receive Downlink Carrier Aggregation, the first lowpass notch frequency is tuned to be about equal to a frequency in a global positioning system (GPS) band and the first highpass notch frequency is tuned to be about equal to a frequency of a highband RF antenna receive signal. In one embodiment of the first RF diplexer 18, during the Receive Downlink Carrier Aggregation, the first lowpass notch frequency is tuned to be about equal to a frequency of a highband RF antenna receive signal and the first highpass notch frequency is tuned to be about equal to a frequency of a lowband RF antenna receive signal.

Those skilled in the art will recognize improvements and modifications to the embodiments of the present disclosure. All such improvements and modifications are considered within the scope of the concepts disclosed herein and the claims that follow.

What is claimed is:

1. An apparatus comprising:
    a first RF highpass with tunable notch filter coupled between a first main port and a first common port, such that the first RF highpass with tunable notch filter is configured to have a first highpass notch frequency, which is configured to be tunable;
    a first RF lowpass with tunable notch filter coupled between a second main port and the first common port, such that the first RF lowpass with tunable notch filter is configured to have a first lowpass notch frequency, which is configured to be tunable, wherein:
        the first RF highpass with tunable notch filter and the first RF lowpass with tunable notch filter form a first RF diplexer configured to receive a function configuration signal and having the first main port, the second main port, and the first common port, and
        the first RF diplexer is further configured to receive a lowband RF transmit signal and a highband RF transmit signal to provide a lowband RF antenna transmit signal and a highband RF antenna transmit signal simultaneously at the first common port, such that the lowband RF antenna transmit signal and the highband RF antenna transmit signal are Transmit Uplink Carrier Aggregation signals; and
    RF system control circuitry configured to adjust, enable, and disable circuits within the first RF diplexer in response to the function configuration signal.

2. The apparatus of claim 1 wherein the first RF diplexer is configured to receive the highband RF transmit signal via the first main port to provide the highband RF antenna transmit signal via the first common port.

3. The apparatus of claim 2 wherein the first RF diplexer is further configured to receive the lowband RF transmit signal via the second main port to provide the lowband RF antenna transmit signal via the first common port.

4. The apparatus of claim 3 wherein during Transmit Uplink Carrier Aggregation, the highband RF transmit signal is substantially isolated from the second main port and the lowband RF transmit signal is substantially isolated from the first main port.

5. The apparatus of claim 3 wherein during Transmit Uplink Carrier Aggregation, the first lowpass notch frequency is tuned to be about equal to a frequency of the highband RF transmit signal and the first highpass notch frequency is tuned to be about equal to a frequency of the lowband RF transmit signal.

6. The apparatus of claim 1 wherein the first RF diplexer is configured to receive a highband RF antenna receive signal via the first common port to provide a highband RF receive signal via the first main port.

7. The apparatus of claim 6 wherein the first RF diplexer is further configured to receive a lowband RF antenna receive signal via the first common port to provide a lowband RF receive signal via the second main port.

8. The apparatus of claim 7 wherein the first RF diplexer is further configured to receive the lowband RF antenna receive signal and the highband RF antenna receive signal simultaneously, such that the lowband RF antenna receive signal and the highband RF antenna receive signal are Receive Downlink Carrier Aggregation signals.

9. The apparatus of claim 1 wherein during Receive Downlink Carrier Aggregation, the first RF diplexer is further configured to receive a highband RF transmit signal via the first main port to provide a highband RF antenna transmit signal via the first common port.

10. The apparatus of claim 9 wherein during the Receive Downlink Carrier Aggregation, the first lowpass notch frequency is tuned to be about equal to a frequency of the highband RF transmit signal and the first highpass notch frequency is tuned to be about equal to a frequency of a lowband RF antenna receive signal.

11. The apparatus of claim 9 wherein during the Receive Downlink Carrier Aggregation, the first lowpass notch frequency is tuned to be about equal to a frequency of a highband RF antenna receive signal and the first highpass notch frequency is tuned to be about equal to a frequency of a lowband RF antenna receive signal.

12. The apparatus of claim 1 wherein during Receive Downlink Carrier Aggregation, the first RF diplexer is further configured to receive a lowband RF transmit signal via the second main port to provide a lowband RF antenna transmit signal via the first common port.

13. The apparatus of claim 12 wherein during the Receive Downlink Carrier Aggregation, the first lowpass notch frequency is tuned to be about equal to a harmonic of a frequency of the lowband RF transmit signal and the first highpass notch frequency is tuned to be about equal to a frequency of a highband RF antenna receive signal.

14. The apparatus of claim 12 wherein during the Receive Downlink Carrier Aggregation, the first lowpass notch frequency is tuned to be about equal to a frequency in a global positioning system (GPS) band and the first highpass notch frequency is tuned to be about equal to a frequency of a highband RF antenna receive signal.

15. The apparatus of claim 12 wherein during the Receive Downlink Carrier Aggregation, the first lowpass notch frequency is tuned to be about equal to a frequency of a highband RF antenna receive signal and the first highpass notch frequency is tuned to be about equal to a frequency of a lowband RF antenna receive signal.

16. The apparatus of claim 1 further comprising:
    a second RF highpass with tunable notch filter coupled between a third main port and a second common port, such that the second RF highpass with tunable notch filter is configured to have a second highpass notch frequency, which is configured to be tunable; and
    a second RF lowpass with tunable notch filter coupled between a fourth main port and the second common port, such that the second RF lowpass with tunable notch filter is configured to have a second lowpass notch frequency, which is configured to be tunable, wherein the second RF highpass with tunable notch filter and the second RF lowpass with tunable notch filter form a second RF diplexer having the third main port, the fourth main port, and the second common port.

17. The apparatus of claim 16 wherein:
the first RF diplexer is configured to receive a highband RF transmit signal via the first main port to provide the highband RF antenna transmit signal via the first common port; and
the second RF diplexer is configured to receive a lowband RF transmit signal via the fourth main port to provide the lowband RF antenna transmit signal via the second common port.

18. The apparatus of claim 16 wherein:
the first RF diplexer is configured to receive a highband RF antenna receive signal via the first common port to provide a highband RF receive signal via the first main port;
the second RF diplexer is configured to receive a lowband RF antenna receive signal via the second common port to provide a lowband RF receive signal via the third main port; and
the lowband RF antenna receive signal and the highband RF antenna receive signal are Receive Downlink Carrier Aggregation signals.

19. The apparatus of claim 1 wherein a primary RF antenna is coupled to the first isolation port.

20. The apparatus of claim 1 wherein the first RF lowpass with tunable notch filter is further configured to be tuned, such that the first lowpass notch frequency is about equal to a frequency of the highband RF transmit signal, and the first RF highpass with tunable notch filter is further configured to be tuned such that the first highpass notch frequency is about equal to a frequency of the lowband RF transmit signal.

* * * * *